(12) United States Patent
Neuwirth et al.

(10) Patent No.: US 11,402,914 B2
(45) Date of Patent: Aug. 2, 2022

(54) APPARATUS FOR PRODUCING A HAPTIC FEEDBACK

(71) Applicant: TDK Electronics AG, Munich (DE)

(72) Inventors: Daniel Neuwirth, Vilshofen (DE); Harald Kastl, Bad Gams (AT)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 17/045,136

(22) PCT Filed: Apr. 2, 2019

(86) PCT No.: PCT/EP2019/058300
§ 371 (c)(1),
(2) Date: Oct. 2, 2020

(87) PCT Pub. No.: WO2019/193006
PCT Pub. Date: Oct. 10, 2019

(65) Prior Publication Data
US 2021/0141456 A1    May 13, 2021

(30) Foreign Application Priority Data

Apr. 5, 2018 (DE) .......................... 102018108061.1

(51) Int. Cl.
G06F 3/01 (2006.01)
G06F 3/0338 (2013.01)
G06F 3/041 (2006.01)

(52) U.S. Cl.
CPC .............. *G06F 3/016* (2013.01); *G06F 3/041* (2013.01)

(58) Field of Classification Search
None
See application file for complete search history.

(56) References Cited

U.S. PATENT DOCUMENTS

| 8,633,916 B2 | 1/2014 | Bernstein et al. |
| 9,857,875 B2 | 1/2018 | Fujii et al. |
| 9,977,499 B2 | 5/2018 | Westerman et al. |

(Continued)

FOREIGN PATENT DOCUMENTS

| DE | 29705688 U1 | 5/1997 |
| DE | 112013002410 T5 | 1/2015 |

(Continued)

*Primary Examiner* — Carl Adams
(74) *Attorney, Agent, or Firm* — Slater Matsil, LLP

(57) ABSTRACT

In an embodiment an apparatus includes a base plate, an interface with a touch-sensitive surface, a piezoelectric actuator and a mechanical reinforcing element, wherein the mechanical reinforcing element is fastened to the piezoelectric actuator, wherein the mechanical reinforcing element is fastened to the interface, wherein the mechanical reinforcing element is configured to deform, as a result of a change of an extension of the piezoelectric actuator, in a first direction such that a partial region of the mechanical reinforcing element is moved relative to the piezoelectric actuator in a second direction perpendicular to the first direction and a force is applied to the interface, wherein the interface is moved, by the force applied, in a direction lateral to the touch-sensitive surface, or wherein the interface is moved, by the force applied, in a direction perpendicular to the touch-sensitive surface.

20 Claims, 10 Drawing Sheets

(56) References Cited

U.S. PATENT DOCUMENTS

| | | |
|---|---|---|
| 10,514,760 B2 | 12/2019 | Takeda |
| 2004/0233174 A1* | 11/2004 | Robrecht .............. G06F 3/0433 345/173 |
| 2011/0193824 A1 | 8/2011 | Modarres et al. |
| 2014/0333179 A1* | 11/2014 | Oh ........................... B06B 1/10 310/323.01 |
| 2015/0309576 A1 | 10/2015 | Tissot |
| 2017/0083094 A1 | 3/2017 | Hajati et al. |
| 2017/0153706 A1 | 6/2017 | Usui et al. |
| 2018/0253157 A1* | 9/2018 | Pankratz ................ B60K 37/06 |
| 2018/0356926 A1 | 12/2018 | Park et al. |
| 2019/0074426 A1 | 3/2019 | Nakao |
| 2019/0196597 A1 | 6/2019 | Rinner et al. |

FOREIGN PATENT DOCUMENTS

| | | |
|---|---|---|
| DE | 102015009942 A1 | 2/2017 |
| DE | 102016116763 A1 | 3/2018 |
| EP | 3214526 A1 | 9/2017 |
| EP | 3279767 A1 | 2/2018 |
| JP | 2008287402 A | 11/2008 |
| JP | 2010146507 A | 7/2010 |
| JP | 2010146516 A | 7/2010 |
| JP | 2016162328 A | 9/2016 |
| JP | 2017175875 A | 9/2017 |
| JP | 2018536240 A | 12/2018 |
| WO | 2011097356 A1 | 8/2011 |
| WO | 2017081868 A1 | 5/2017 |

\* cited by examiner

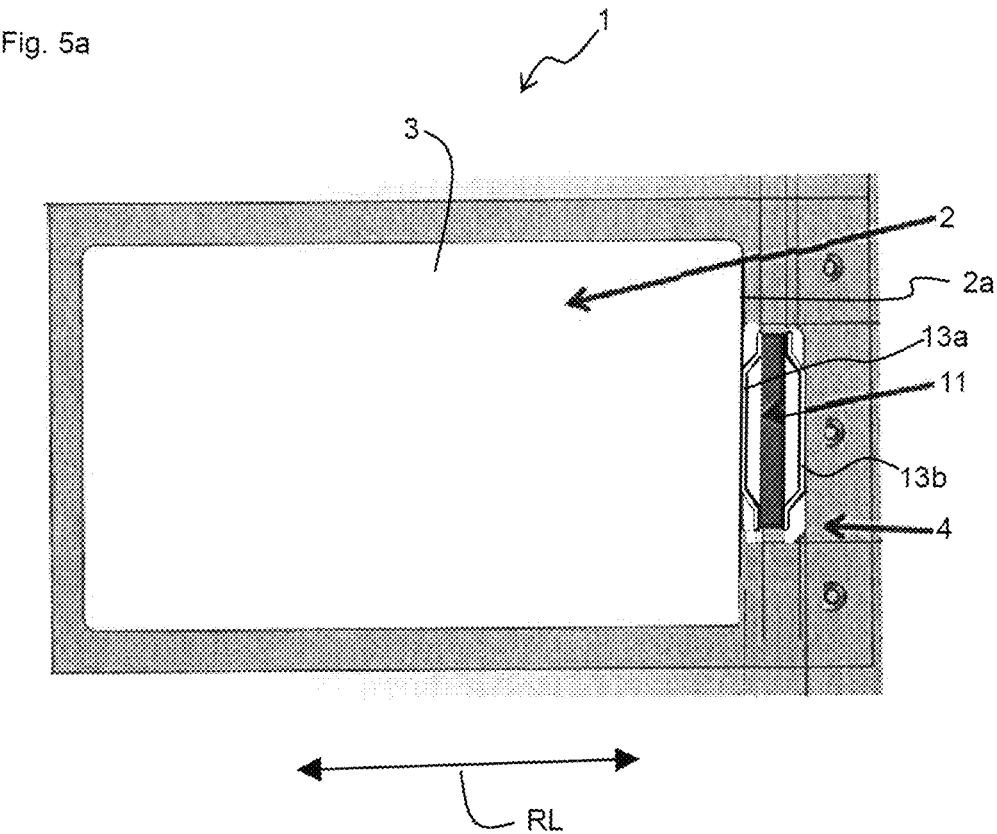
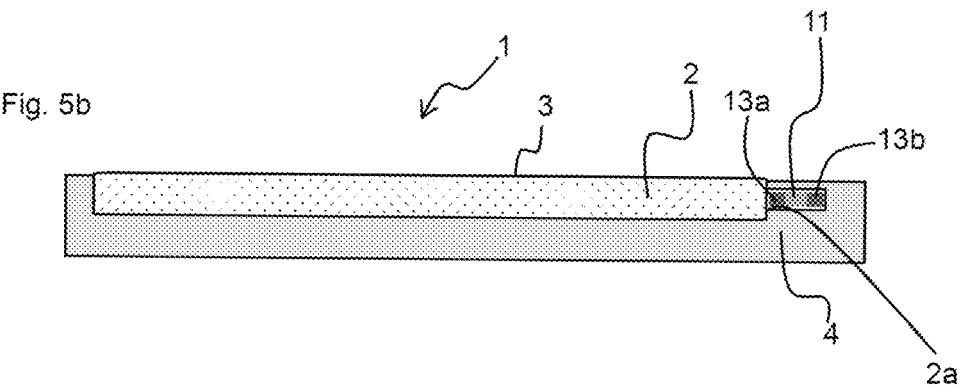

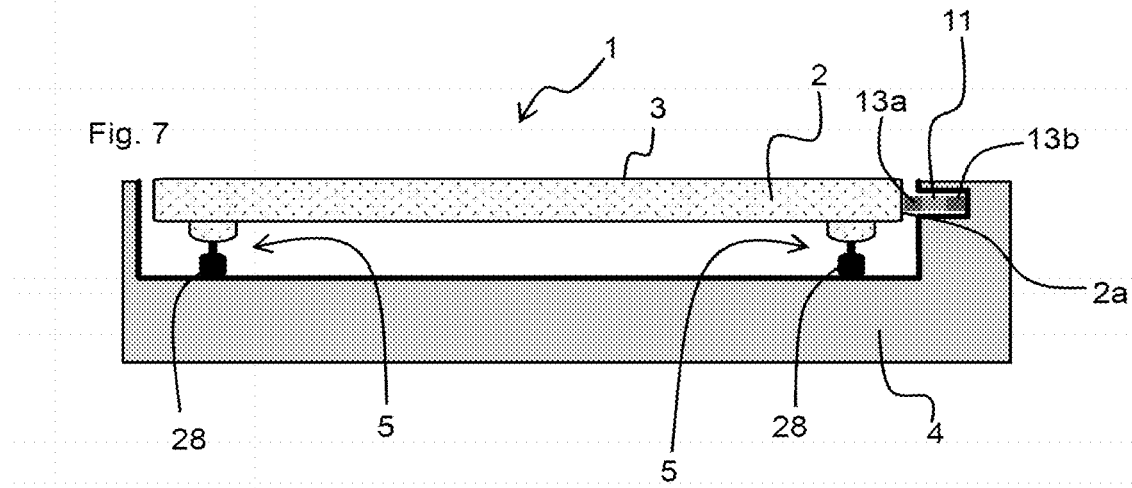
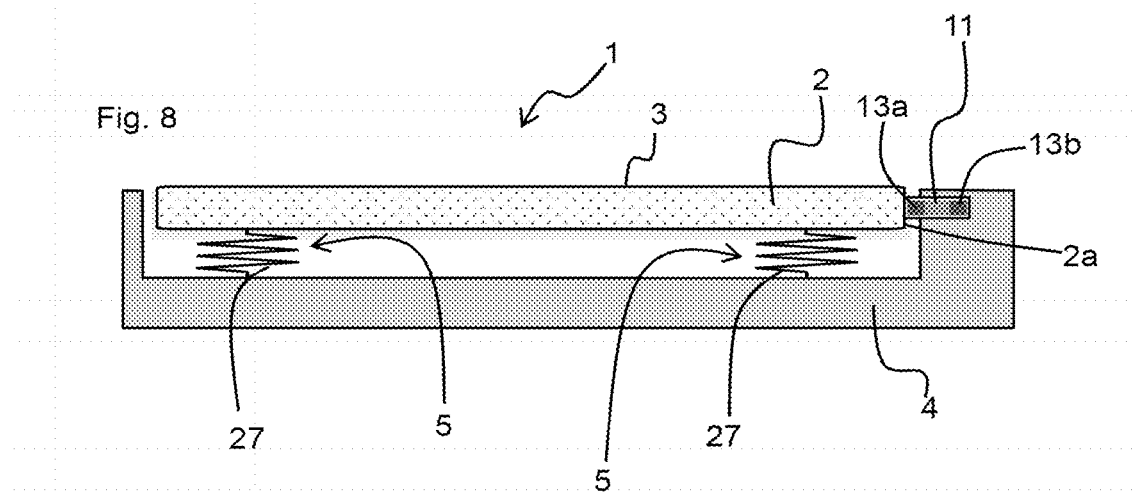
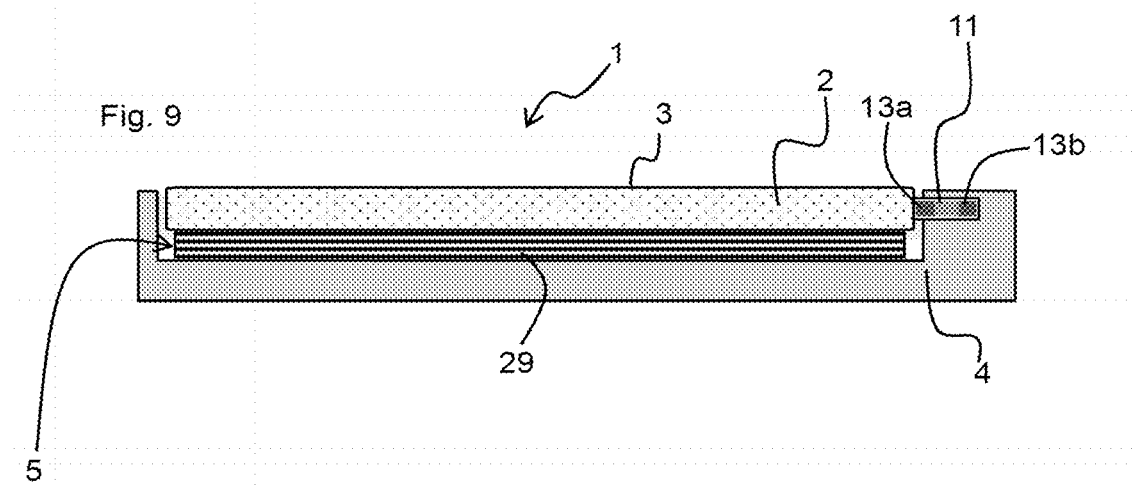

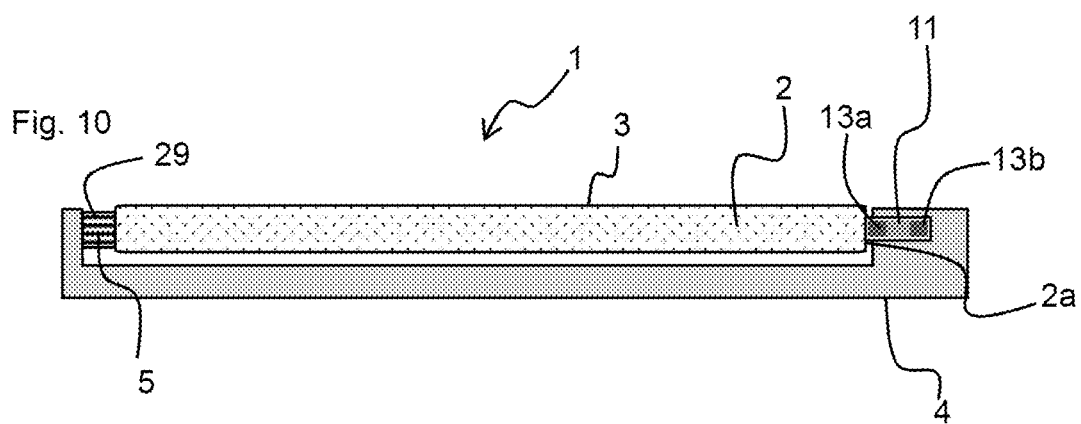
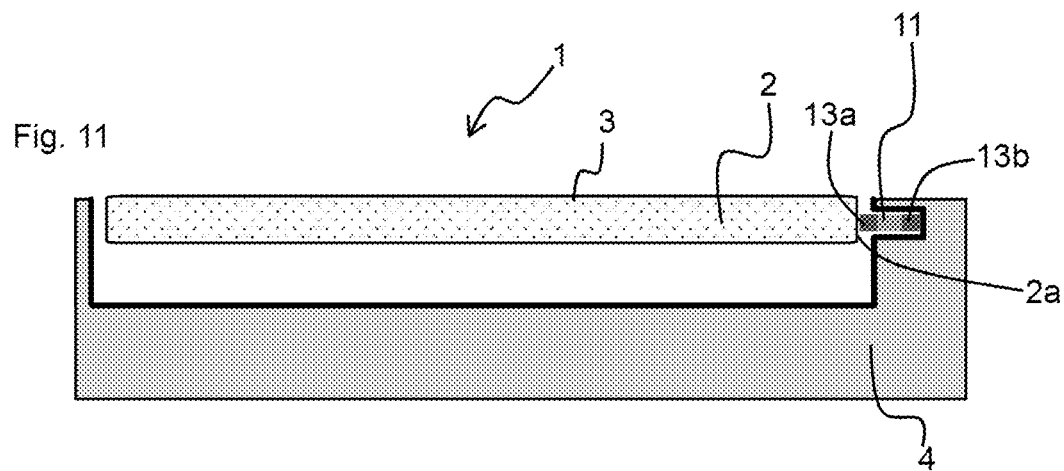
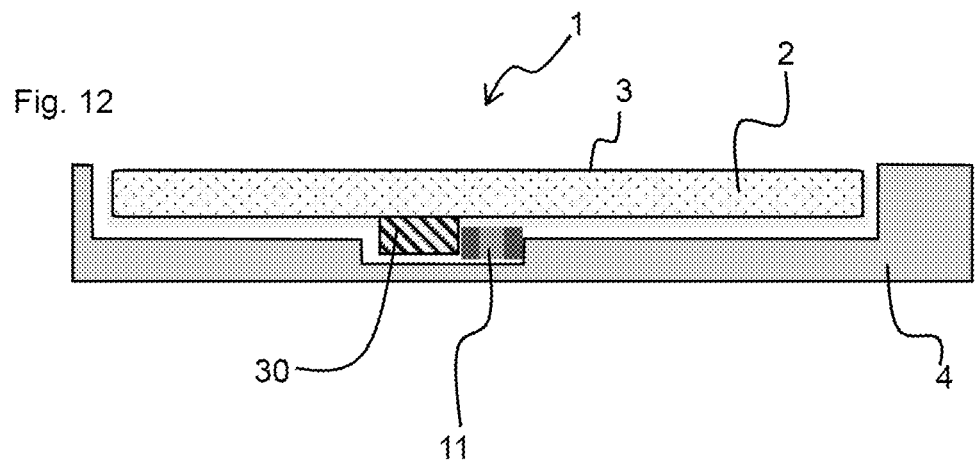

APPARATUS FOR PRODUCING A HAPTIC FEEDBACK

This patent application is a national phase filing under section 371 of PCT/EP2019/058300, filed Apr. 2, 2019, which claims the priority of German patent application 102018108061.1, filed Apr. 5, 2018, each of which is incorporated herein by reference in its entirety.

TECHNICAL FIELD

The present invention relates to an apparatus for producing a haptic feedback.

BACKGROUND

Increasingly inter alia in motor vehicles, conventional buttons and switches for operating equipment are being replaced by purely electronic variants, in particular by touch-sensitive screens. Particularly advantageous here is the high flexibility of the touch-sensitive screens. Possibly an air-conditioning system, a navigation device, a car radio and a lighting system can be controlled with a single interface. Frequently large and heavy screens are installed in motor vehicles for this purpose.

However, an essential disadvantage of using touch-sensitive screens in vehicles is that a driver of the vehicle could be forced to actively look at the screen in order to be able to identify that a button has been successfully pressed or that a desired function has been correctly initiated. Specifically in motor vehicles this can be a safety risk since the driver is diverted in this way for a certain time.

In order to avoid this disadvantage, touch-sensitive screens and other interfaces are frequently provided with an apparatus for producing a haptic feedback. For example, after actuating a virtual button an interface can be made to vibrate in order to notify the user in this way that the button has been correctly operated.

SUMMARY

Embodiments provide an improved apparatus for producing a haptic feedback-.

An apparatus for producing a haptic feedback is proposed which comprises an interface with a touch-sensitive surface, a piezoelectric actuator and a mechanical reinforcing element. The mechanical reinforcing element is fastened to the piezoelectric actuator. The mechanical reinforcing element is directly or indirectly fastened to the interface. The mechanical reinforcing element is configured and arranged to deform as a result of a change of an extension of the piezoelectric actuator in a first direction in such a manner that a partial region of the mechanical reinforcing element is moved relative to the piezoelectric actuator in a second direction which is perpendicular to the first direction. A force is thereby applied to the interface which moves the interface in a direction laterally to the touch-sensitive surface. Alternatively, a force may thereby be applied to the interface which moves the interface in a direction perpendicular to the touch-sensitive surface.

The use of a piezoelectric actuator to produce the haptic feedback affords the advantage of a short response time. After detecting an actuation of the touch-sensitive surface, a piezoelectric actuator can produce a haptic feedback within a few milliseconds. The piezoelectric actuator thus provides a significantly shorter response time than other means for producing a haptic feedback such as linear resonators for example.

The mechanical reinforcing element can be configured to translate the variation of the extension of the piezoelectric actuator in the first direction into a movement of the partial region in the second direction, wherein the amplitude of the movement in the second direction is significantly greater than the variation of the extension of the actuator. Accordingly, it can enable the mechanical reinforcing element to move a large and heavy interface with a piezoelectric actuator. If the interface was only moved by a distance whose length corresponds to the variation of the extension of the actuator, the resulting movement would only be barely perceptible for the human sense of touch. The interface can however be moved by a distance whose length corresponds to the amplitude of the movement of the partial region in the second direction so that a larger movement of the interface results, which is readily perceptible for the human sense of touch.

The second direction can in particular be perpendicular to the first direction. The second direction can correspond to the lateral direction in which the interface is moved to produce the haptic feedback.

The actuator and the reinforcing element are arranged in such a manner that the interface is moved in a direction laterally to its touch-sensitive surface. For a user such a movement cannot be distinguished from a movement of the interface perpendicular to its touch-sensitive surface. During movements perpendicular to the touch-sensitive surface which are also designated hereinafter as movements in the parallel direction, as a result of a low bending stiffness with respect to movements in the parallel direction, the interface can be set into undesired natural vibrations. These natural vibrations have the effect that the user perceives the haptic feedback with varying intensity at different positions on the surface. If the interface is moved in the lateral direction however, no natural vibrations of the interface occur and the user perceives the haptic feedback with the same intensity at each position of the interface. For the user a more pleasant usage experience is thereby obtained.

In some applications, a movement of the interface in the direction perpendicular to the touch-sensitive surface can be desired.

The actuator can be connected to more than one mechanical reinforcing element. Preferably the actuator has two mechanical reinforcing elements of which one is arranged on its upper side which faces the interface and one is arranged on its underside which faces away from the interface. In alternative embodiments the reinforcing element arranged on the underside could be dispensed with.

The interface can preferably be a screen with a touch-sensitive surface. Such screens are frequently large and heavy and have a low bending stiffness during movements in the parallel direction. Accordingly, in particular in the case of such interfaces, a movement in the lateral direction to produce the haptic feedback is advantageous.

In alternative embodiments, the interface could also be a simple button or another input device.

The partial region of the mechanical reinforcing element can be fastened to a side surface of the interface which is perpendicular to the touch-sensitive surface. As a result of the arrangement of the partial region on the side surface, a simple structure can be obtained in which the piezoelectric actuator and the mechanical reinforcing unit are configured to move the interface in the lateral direction. The force produced by the actuator can be transmitted in a simple manner and without significant losses to the interface as a result of the arrangement of the mechanical reinforcing element on the side surface.

Furthermore, the apparatus can have a base plate, wherein the piezoelectric actuator is arranged and configured to move the interface relative to the base plate to produce the haptic feedback. In particular, the haptic feedback can be produced by a relative movement of the interface to the base plate. The base plate can in particular be configured to enable installation of the apparatus in any device, for example a vehicle or a mobile telephone. To this end, the base plate can be configured to be fastened mechanically to any device.

The piezoelectric actuator can be arranged and configured to move the interface at an angle $\alpha$ relative to the base plate to produce the haptic feedback, wherein $0°\alpha180°$. If the angle $\alpha=0°$, a movement of the interface parallel to the base plate is present. If the angle $\alpha=90°$, a movement of the interface perpendicular to the base plate is present. Movements in any other desired direction of the interface relative to the base plate are also possible. Here, the interface can be moved in particular obliquely with respect to the base plate.

If the angle $\alpha$ is in the range $90°<\alpha\leq180°$, the interface can be arranged in an overhanging manner in relation to the base plate. Such an arrangement of the interface can be selected for example, if the interface is an overhead display. An overhead display may for example be used in vehicles.

The interface can be connected to the base plate via a flexible connection. The flexible connection can be configured in such a manner that a relative movement of the interface with respect to the base plate is made possible. As a result of the flexible connection, it can be ensured that the interface cannot move beyond a maximum distance from the base plate and at the same time can always move relative to the base plate to produce the haptic feedback. The flexible connection can have one or more springs. Alternatively or additionally, the spring-loaded connection can comprise a soft material, for example rubber.

The flexible connection may fasten the interface to the base plate in a lateral direction. Alternatively or in addition, the flexible connection may fasten the interface to the base plate in a direction perpendicular to the touch-sensitive surface.

The flexible connection may have a spring, a damper, a foam element or a rubber buffer.

The flexible connection can be configured to allow a movement of the interface relative to the base plate and produce a preload which must be overcome for a movement of the interface relative to the base plate.

The interface may lie loosely on the base plate.

The interface can be free-floating relative to the base plate. Here, the interface can be mechanically fastened only to the piezoelectric actuator.

The mechanical reinforcing element can be connected to the interface by an adhesive bonding, a screw connection, a weld, a clamping, a bracing or a soldering. The mechanical reinforcing element can be connected to the interface directly or indirectly via at least one further element. In this case, the connection of the mechanical reinforcing element to the interface can be configured in such a manner that at least the partial region of the reinforcing element cannot be moved relative to the interface. Accordingly, the connection can be configured so that the interface follows a movement of the partial region of the mechanical reinforcing element.

The piezoelectric actuator can be connected to the base plate by an adhesive bonding, a screw connection, a weld or a clamping directly or indirectly via at least one further element. The further element can for example, be one or more mechanical reinforcing elements.

The mechanical reinforcing element can be configured and arranged so that the movement of the partial region in the second direction has a larger amplitude than the variation of the extension of the piezoelectric actuator in the first direction. The reinforcing element can accordingly form a translation which deflects the movement of the actuator in the first direction into the second direction and thereby enlarges the amplitude of the movement. In this case, the amplitude of the movement in the second direction can be at least five times greater than the variation of the extension of the actuator, preferably the amplitude is at least ten times larger.

The partial region can be arranged at a distance from a surface of the piezoelectric actuator, wherein the mechanical reinforcing element has two end regions which are fastened to the surface of the piezoelectric actuator, wherein the two end regions directly adjoin the partial region, wherein the two end regions are arranged on opposite sides of the partial region. As a result of a variation of the extension of the piezoelectric actuator in the first direction, the end regions are moved towards one another or away from one another. As a result, the partial region can be moved in the second direction.

The mechanical reinforcing element can be bow-shaped.

The apparatus can further comprise a control unit which is configured to apply a voltage pulse to the piezoelectric actuator when an actuation of the touch-sensitive surface is detected. The control unit can be integrated in the interface. The voltage pulse can, for example, be a single sinusoidal, rectangular or sawtooth-shaped voltage pulse. Alternatively this can be two or more sinusoidal, rectangular or sawtooth-shaped voltage pulses.

The control unit can be configured to apply a voltage pulse to the piezoelectric actuator which has the effect that the mechanical reinforcing element is deformed in such a manner that a haptic feedback is produced with respect to an object pressing on the touch-sensitive surface, which simulates a force jump. As a result of the force jump, a feeling of the actuation of a mechanical button can be perceived for the user. The force jump is characterized in that the user is imparted the haptic impression that after exceeding a switching point a mechanical resistance of the surface abruptly decreases.

The apparatus can further comprise a second mechanical reinforcing element which is fastened to the piezoelectric actuator. The actuator can be arranged between the two reinforcing elements, wherein the second mechanical reinforcing element is configured and arranged to deform as a result of the variation of the extension of the piezoelectric actuator in the first direction in such a manner that a partial region of the second mechanical reinforcing element is moved relative to the piezoelectric actuator in a second direction, which is perpendicular to the first direction. The second reinforcing element can be structurally the same as the first reinforcing element.

BRIEF DESCRIPTION OF THE DRAWINGS

The present invention is explained in detail hereinafter with reference to the figures.

FIGS. 5a and 5b show a first exemplary embodiment of an apparatus for producing a haptic feedback;

FIGS. 7 to 14 show a third to tenth exemplary embodiment of an apparatus for producing a haptic feedback;

DETAILED DESCRIPTION OF ILLUSTRATIVE EMBODIMENTS

Figure 1:
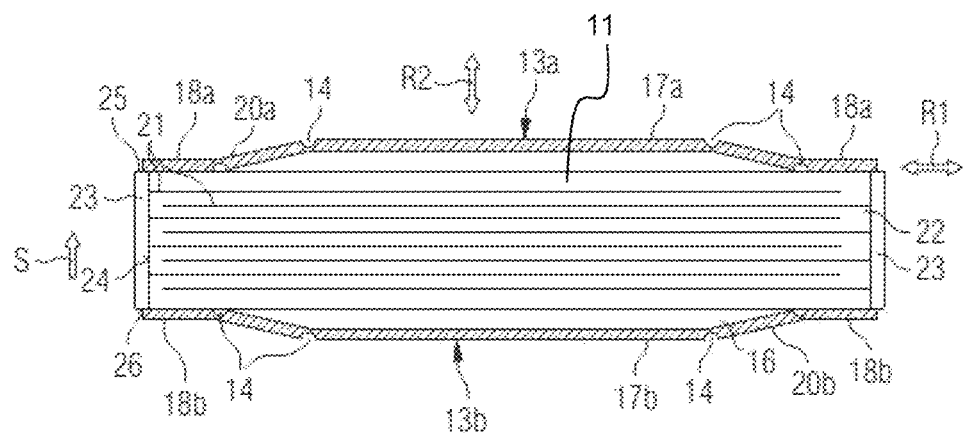
FIGS. 1, 2 and 3 each show a piezoelectric actuator with two reinforcing elements.
Figure 2:
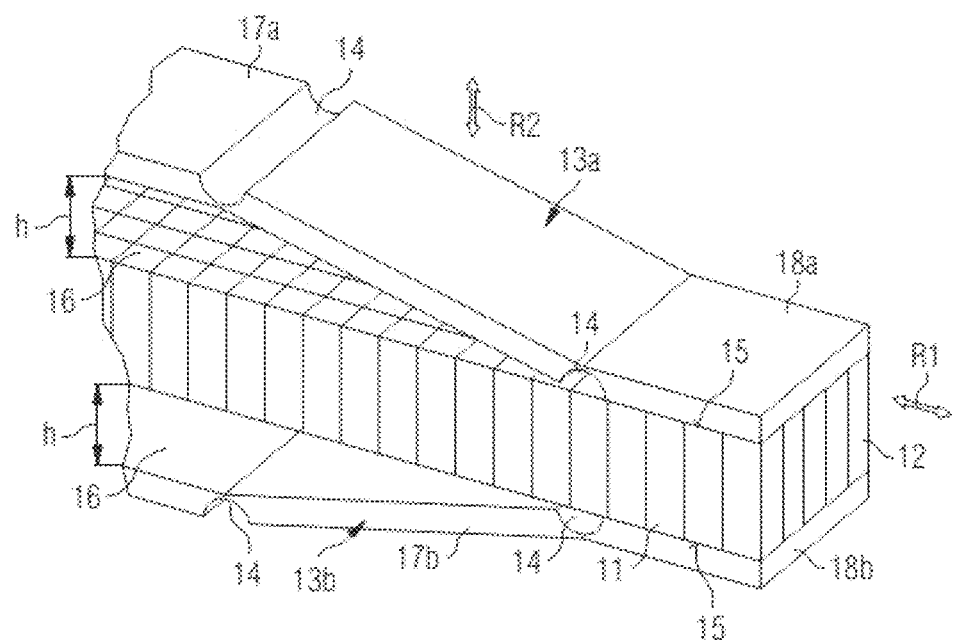
Figure 3:
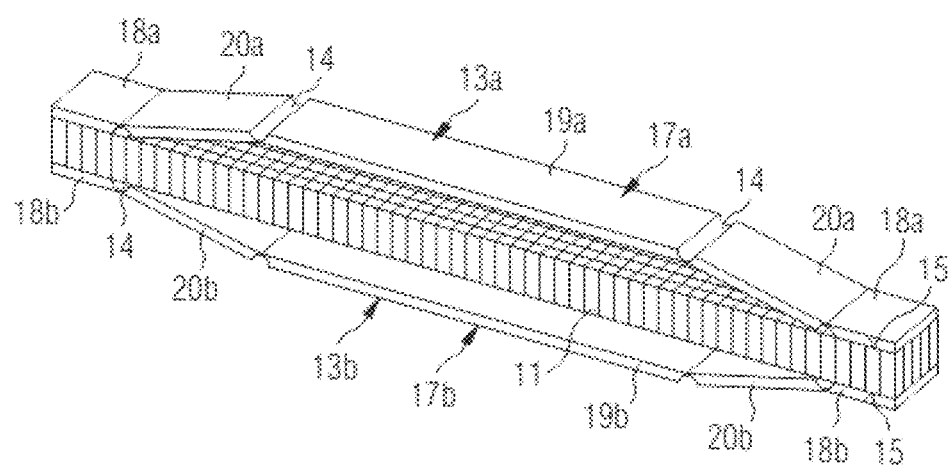

FIGS. 1, 2 and 3 show a piezoelectric actuator 11 with two reinforcing elements 13a, 13b. The piezoelectric actuator 11 can be used in an apparatus according to embodiments to produce a haptic feedback.

The piezoelectric actuator 11 is a sintered component having a plurality of piezoelectric layers 22 and internal electrodes 21. The piezoelectric actuator 11 in particular has a plurality of piezoelectric or active layers 22 which are arranged above one another to form a stack. The internal electrodes 21 are arranged between the piezoelectric layers 22. In this case, internal electrodes 21 of different polarity are arranged alternately.

The piezoelectric layers 22 can comprise lead zirconate titanate ceramics (PZT ceramics). The PZT ceramic can further additionally contain Nd and Ni. Alternatively the PZT ceramic can further additionally comprise Nd, K and optionally Cu. Alternatively the piezoelectric layers can comprise a composition containing $Pb(Zr_xTi_{1-x})O_3+yPb(Mn_{1/3}Nb_{2/3})O_3$.

The piezoelectric layers 22 have a stack direction S. The stack direction S extends along front or side faces 24 of the actuator 11. In particular, the piezoelectric layers 22 are stacked along a vertical extension or thickness of the actuator 11.

The actuator ii has two insulation regions 12. The respective insulation region 12 is formed in one end region of the actuator 11. In particular, the respective insulation region 12 is formed in the area of a front face 24 of the actuator 11.

In the insulation region 12 only internal electrodes 21 of one polarity extend as far as the front face 24 of the actuator 11. The insulation region 12 can be used for contacting the actuator 11. For example, the respective insulation region 12 can be provided with external electrodes 23 for electrical contact.

The actuator 11 is configured so that when an electrical voltage is applied, a deformation of the actuator 1 takes place. This involves a variation of the extension of the actuator 11 in a first direction R1. In particular, the piezoelectric layers 22 are polarized in such a manner that the application of an electrical voltage between the internal electrodes 21 results in a transverse contraction of the actuator 11 in which the length of the actuator 11 varies perpendicular to the stack direction S. Consequently a variation of the extension of the actuator 1 takes place transversely to the direction of polarization and to the electric field (d31 effect). In order to further intensify the effect of the length variation in the stack direction S, the apparatus has two reinforcing elements 13a, 13b. When voltage is applied to the actuator 11, the reinforcing elements 13a, 13b are deformed at least partially as a result of the variation of the extension of the actuator 11, as will be described subsequently in detail.

The actuator 11 is arranged between the reinforcing elements 13a, 13b. The reinforcing elements 13a, 13b lie at least partially on an upper side 25 or an underside 26 of the actuator 11. The respective reinforcing element 13a, 13b preferably has a width which corresponds to the width of the actuator 11. The same preferably applies to the length of the reinforcing elements 13a, 13b.

The respective reinforcing element 13a, 13b is formed in one piece. The respective reinforcing element 13a, 13b has a rectangular shape. The respective reinforcing element 13a, 13b is configured to be strip-shaped. The respective reinforcing element 13a, 13b is configured to be curved or bent. For example, the respective reinforcing element comprises a sheet metal strip. The sheet metal strip is bent, as will be explained in detail hereinafter.

Each of the one-piece reinforcing elements 13a, 13b is divided into several regions or sections. The respective reinforcing element 13a, 13b has a partial region or first region 17a, 17b. The partial region 17a, 17b each has a first section or central region 19a, 19b.

The partial region 17a, 17b further has two second sections or connecting regions 20a, 20b in each case. The two connecting regions 20a, 20b of the respective reinforcing element 13a, 13b directly adjoin the central region 19a, 19b of the respective reinforcing element 13a, 13b. The central region 19a, 19b of the respective reinforcing element 13a, 13b is in other words surrounded by the two connecting regions 20a, 20b on both sides.

The respective reinforcing element 13a, 13b further has two end regions 18a, 18b. The end regions 18a, 18b directly adjoin the connecting regions 20a, 20b of the respective reinforcing element 13a, 13b. In other words, respectively one connecting region 20a, 20b connects an end region 18a, 18b to the central region 19a, 19b of a reinforcing element 13a, 13b.

The two end regions 18a, 18b of the respective reinforcing element rest directly on a surface of the actuator 11. Thus, the first and the second end region 18a of the first reinforcing element 13a rest on a partial region of the upper side 25 of the actuator 11. Furthermore, the first and the second end region 18b of the second reinforcing element 13b rest on a partial region of the underside 26 of the actuator 11.

The end regions 18a, 18b are preferably undetachably connected to the surface of the actuator 11. In particular, the end regions 18a, 18b are connected to the surface of the actuator 11 by an adhesive connection 15.

The respective partial region 17a, 17b is spaced apart from the surface of the actuator 11. In particular, a free region 16 is located between the respective partial region 17a, 17b and the underside 26 or the upper side 25 of the actuator 11. The free region 16 has a height h. The maximum height h and therefore the maximum distance between the actuator 11 and the partial region 17a, 17b is preferably less than or equal to 3 mm, preferably 2.5 mm.

The height h of the free region 16 varies along the respective partial region 17a, 17b. Thus, the central region 19a, 19b of the respective partial region 17a, 17b is configured so that it runs parallel to the surface of the actuator 11. Thus, the height h of the free region 16 has a maximum in the area of the central region 19a, 19b. The respective connecting region 20a, 20b on the other hand runs obliquely with respect to the surface of the actuator 11. In other words, the respective connecting region 20a, 20b encloses an angle with the upper side 25 or the underside 26 of the actuator 11. The angle is preferably less than or equal to 45°. Thus, the height h of the free region 16 decreases in the direction from the central region 19a, 19b to the end region 18a, 18b of the respective reinforcing element 13a, 13b. Consequently the respective reinforcing element 13a, 13b has a bent shape.

The respective reinforcing element 13a, 13b further has at least one thinning 14, preferably a plurality of thinnings 14. In FIGS. 1 to 3 the respective reinforcing element 13a, 13b has four thinnings 14. The thinnings 14 can be seen as a region in which the respective reinforcing element 13a, 13b is thinner, i.e., has a smaller vertical extension or thickness than in the remaining region. The thinnings 14 are provided so that the reinforcing element 13a, 13b can bend at the location of the thinning 14 when the actuator 11 is deflected. Preferably the thinnings 14 are formed in transition regions of the respective reinforcing element 13a, 13b. A thinning 14 is formed in each case here in the transition region between connecting region 20a, 20b and end region 18a, 18b. Furthermore, in each case a thinning 14 is located in the transition region between central region 19a, 19b and connecting region 20a, 20b. In the transition regions the reinforcing element 13a, 13b must bend when the actuator 11 is deformed. The thinnings 14 ensure the necessary flexibility of the reinforcing element 13a, 13b.

If voltage is now applied to the actuator 11, the partial regions 17a, 17b of the respective reinforcing element 13a, 13b move relative to the actuator 11 in a second direction R2. The second direction R2 is perpendicular to the first direction R1. The second direction R2 runs along the stack direction S.

In particular, the central regions 19a, 19b move in the second direction R2. In so doing the respective reinforcing element 13a, 13b bends at the location of the thinnings 14 between central region 19a, 19b and connecting regions 20a, 20b and between connecting regions 20a, 20b and end regions 18a, 18b.

On the other hand, a movement of the end regions 18a, 18b in the second direction R2 is prevented by the adhesive connection 15 to the actuator 11. On the contrary, the end regions 18a, 18b move with the actuator 11 in the first direction R1. A relative movement therefore takes place between the end regions 18a, 18b and the partial regions 17a, 17b.

Figure 4:
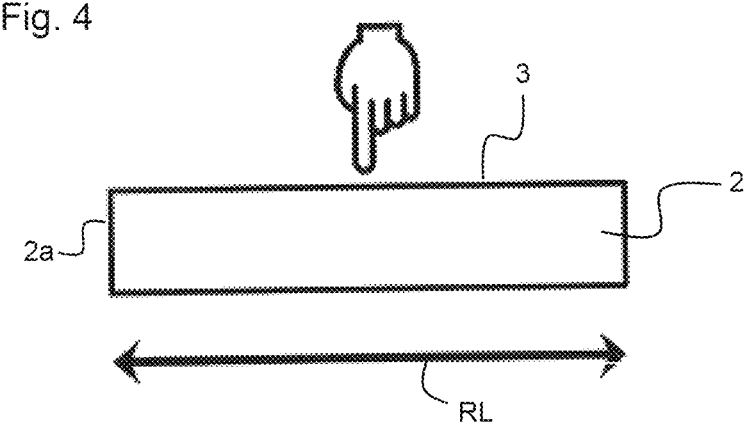
FIG. 4 shows schematically a production of a haptic feedback.

The piezoelectric actuator 11 shown in FIGS. 1 to 3 is used in an apparatus 1 for producing a haptic feedback. FIG. 4 shows schematically the production of the haptic feedback.

The apparatus 1 has an interface 2 with a touch-sensitive surface 3. This is preferably a touch-sensitive screen. In order to actuate the interface 2 a pressure is applied to the touch-sensitive surface 3. If such an actuation is detected, a vibration of the interface 2 is initiated. To this end the interface 2 is moved in a lateral direction RL. The lateral direction RL is perpendicular to the direction of the application of pressure to the touch-sensitive surface 3. The lateral direction RL is parallel to the touch-sensitive surface 3.

For a user of the apparatus 1 movements of the interface 2 in the lateral direction RL cannot be distinguished from movements of the interface 2 in a parallel direction which is perpendicular to the lateral direction RL. If the interface 2 is a large and heavy screen, the movements in the lateral direction RL have essential advantages with respect to movements in the parallel direction. As a result of a lower bending stiffness of the screen, undesired natural vibrations are excited during movement in the parallel direction. These have the result that the user perceives the haptic feedback with varying intensity at different positions of the screen. However, this problem does not arise with movements in the lateral direction RL.

The movement of the interface 2 in the lateral direction RL can be brought about by the piezoelectric actuator 11. Exemplary embodiments are explained with reference to FIGS. 5 and 6 to show the possibilities for fastening the actuator 11 to the interface 2.

Hereinafter, the mechanical reinforcing element 13a arranged on the upper side 25 of the piezoelectric actuator 11 is designated as first mechanical reinforcing element 13a, wherein the upper side 25 of the piezoelectric actuator 11 is that side facing the interface 2. The mechanical reinforcing element 13b arranged on the underside 26 of the piezoelectric actuator 11 is designated hereinafter as second mechanical reinforcing element 13b, wherein the underside 26 of the piezoelectric actuator 11 lies opposite the upper side 25. The second mechanical reinforcing element 13b is an optional component. According to alternative embodiments, the apparatus 1 only has the first reinforcing element 13a arranged on the upper side 25 of the actuator 11 and no second reinforcing element 13b.

FIGS. 5a and 5b show a first exemplary embodiment of the apparatus 1 for producing a haptic feedback. FIG. 5a shows a plan view, and FIG. 5b shows a lateral cross section.

The apparatus 1 has a base plate 4. The base plate 4 may be a bottom plate or a rear wall. The haptic feedback is produced by a relative movement of the interface 2 with respect to the base plate 4. During the relative movement the base plate 4 remains substantially unmoved whilst the interface 2 is moved in the lateral direction RL. For this purpose the base plate 4 can be fastened to a further device, for example a vehicle. The base plate 4 can have a substantially greater mass compared to the interface 2, for example, a mass which is at least ten times as great as the mass of the interface 2.

The base plate 4 can form a frame. The frame has an opening or aperture whose shape substantially corresponds to the shape of the interface 2. The base plate can thus frame the interface 2.

The apparatus 1 further comprises the piezoelectric actuator 11 described in connection with FIGS. 1 to 3. The first reinforcing element 13a is fastened to a side surface 2a of the interface 2 which is perpendicular to the touch-sensitive surface 3 of the interface 2. In particular, the central region 19a of the partial region 17a is fastened to the side surface 2a. In this case, the central region 19a is fastened to the side surface 2a in such a manner that the interface 2 cannot move relative to the central region 19a and thus follows every movement of the central region 19a. The partial region 17a can be fastened to the side surface 2a of the interface 2 by a non-detachable connection, for example, an adhesive connection or a weld, or by a detachable connection, for example, a screw connection. The piezoelectric actuator 11 is fastened to the interface 2 in such a manner that the second direction R2 in which the partial region 17a can be moved as a result of a variation in the extension of the actuator 11 in the first direction R1 corresponds to the lateral direction RL.

If a voltage pulse is applied to the actuator 11, the partial region 17a of the first reinforcing element 13a is moved in the second direction R2. Since the interface 2 is firmly connected to the partial region 17a, the interface 2 is moved in the lateral direction RL due to the movement of the partial region 17a in the second direction R2. In this way the haptic feedback is produced.

The second reinforcing element 13b is further fastened on the base plate 4. In this case, the partial region 17b of the second reinforcing element 13b is firmly connected to the base plate 4 so that the central region 19b of the partial region 17b cannot move relative to the base plate 4. The partial region 17b of the second reinforcing element 13b can for example, be adhesively bonded to the base plate 4, screwed to the base plate 4 or welded to the base plate 4. Since the base plate 4 either has a substantially higher mass than the interface 2 or is fastened to another device, for example, a vehicle, the base plate 4 is not moved due to a variation of the extension of the actuator 11.

The interface 2 in the first exemplary embodiment is only connected to the base plate 4 via the two reinforcing elements 13a, 13b and the piezoelectric actuator 11. The apparatus 1 has no further mechanical connection between the interface 2 and the base plate 4. Accordingly, the interface 2 can move relative to the base plate 4. The interface 2 lies loosely on the base plate 4. When the haptic signal is produced, the interface 2 slides over the base plate 4.

The base plate 4 is arranged parallel to the touch-sensitive surface of the interface.

A simple structure is thus obtained which enables movements of the interface 2 in a lateral direction RL relative to the base plate 4.

Figure 6A:
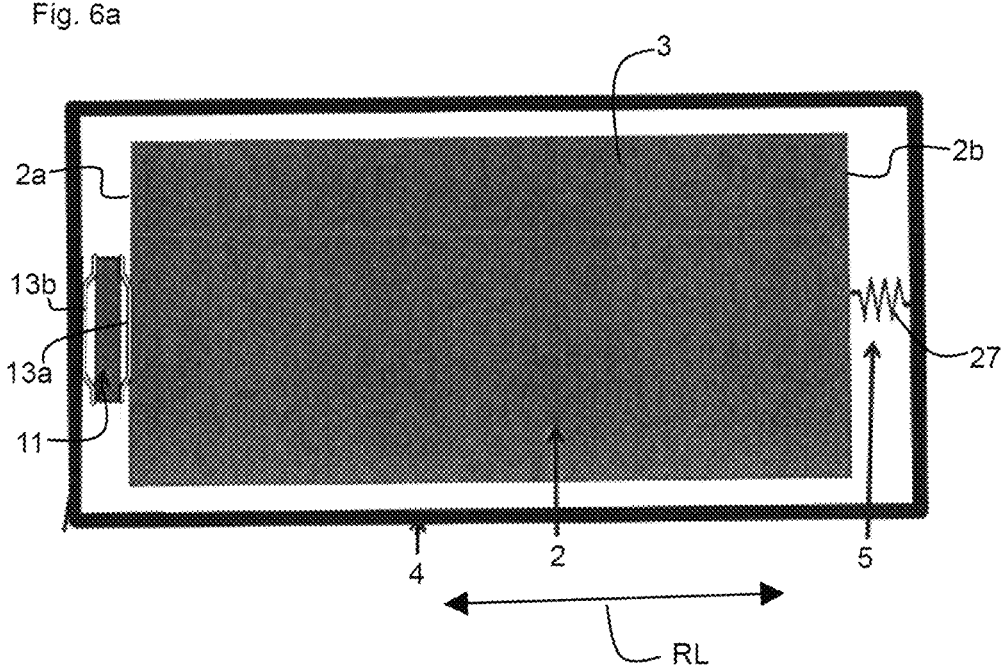
FIGS. 6a and 6b show a second exemplary embodiment of an apparatus for producing a haptic feedback.
Figure 6B:
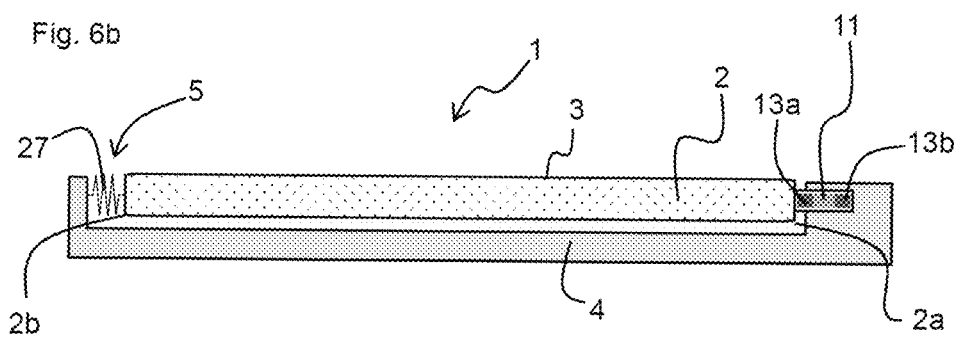

FIGS. 6a and 6b show a second exemplary embodiment of the apparatus 1. FIG. 6a shows a plan view and FIG. 6b shows a cross section.

According to the second exemplary embodiment, the interface 2 is connected via a flexible connection 5 to the base plate 4. The flexible connection 5 can in this case be formed on a side surface 2b of the interface 2 which is opposite the side surface 2a which is connected to the first reinforcing element 13a. Alternatively the flexible connection 5 can also be formed on another side surface of the interface 2 or on several side surfaces of the interface 2.

In the second exemplary embodiment shown in FIGS. 6a and 6b, the flexible connection 5 comprises a spring 27 which connects the interface 2 to the base plate 4. The flexible connection 5 can also comprise two or more springs 27 which each connect the interface 2 to the base plate 4. Alternatively or additionally to the springs 27, the flexible connection 5 can comprise a resilient material, for example, a soft rubber.

The flexible connection 5 allows relative movements of the interface 2 with respect to the base plate 4. However, the amplitude of the relative movement can be limited by the flexible connection 5. The flexible connection 5 can bring about a preload of the interface 2 relative to the base plate 4, which preload must be overcome for a movement of the interface 2 relative to the base plate 4.

The spring 27 of the flexible connection 5 connects the interface 2 to the base plate 4 in a lateral direction, that is to say, in a direction which is perpendicular to the touch-sensitive surface 3 of the interface 2.

In the second exemplary embodiment, the interface 2 is fastened to the base plate 4 by means of the piezoelectric actuator 11 and the flexible connection 5 such that the interface 2 is suspended over the base plate. The interface 2 does not lie against the base plate 4.

As has already been explained in connection with the first exemplary embodiment, the partial region 17a of the first reinforcing element 13a is connected to the side surface 2a of the interface 2. Accordingly, a haptic feedback can be produced by movement of the partial region 17a in the second direction R2, wherein the interface 2 is moved in the lateral direction RL.

In contrast to the first exemplary embodiment, in this case the piezoelectric actuator 11 need not be firmly connected to the frame formed by the base plate 4. In addition to the connection possibilities of an adhesive bonding, welding or screw connection of the partial region 17b of the second reinforcing element 13b to the base plate 4 mentioned in connection with the first exemplary embodiment, in the second exemplary embodiment it is also possible to clamp the actuator 11 between the interface 2 and a frame formed by the base plate 4. In this case, the clamping can be brought about by the flexible connection 5 between the base plate 4 and the interface 2. The flexible connection 5 can be pre-tensioned in the rest state shown in FIGS. 6a and 6b in which no voltage is applied to the actuator 11. It is furthermore also possible that the partial region 17a of the first reinforcing element 13a is merely connected to the interface 2 by clamping.

If a voltage is applied to the piezoelectric actuator 11, this has the result that as a result of a movement of the reinforcing elements 13a, 13b in the second direction R2, the interface 2 is moved in the lateral direction RL relative to the base plate 4, as has already been explained in connection with the first exemplary embodiment.

FIG. 7 shows a third exemplary embodiment of the apparatus 1. FIG. 7 shows a cross section.

According to the third exemplary embodiment, the piezoelectric actuator 11 is arranged with the two reinforcing elements 13a, 13b on the first side surface 2a of the interface 2. In particular, the first reinforcing element 13a is connected directly to the first side surface 2a. The second reinforcing element 13b is directly connected to the base plate 4.

The interface 2 is connected to the base plate 4 via a flexible connection 5. The flexible connection 5 is arranged on an underside, which faces toward the base plate 4, of the interface 2. Accordingly, the flexible connection 5 is formed perpendicularly to the lateral direction RL in which the interface 2 is moved when the haptic signal is produced. In the lateral direction, the interface 2 is connected to the base plate 4 only on the side surface 2a via the piezoelectric actuator 11 and the two reinforcing elements 13a, 13b.

The side surface 2b which is situated opposite the side surface 2a is not connected to the base plate 4. Accordingly, the apparatus according to the third exemplary embodiment has a flexible connection 5 of the interface 2 to the base plate 4 in the perpendicular direction, and no flexible connection 5 of the interface 2 to the base plate 4 in the lateral direction RL.

The flexible connection 5 has two rubber buffers 28. The rubber buffers 28 have an elasticity which permits lateral movements of the interface 2 relative to the base plate 4. The flexible connection 5 brings about a preload between the interface 2 and the base plate 4. The preload must be overcome in order to move the interface 2 relative to the base plate 4.

The flexible connection 5 makes it possible to stabilize the interface 2 and limit the movement radius by which the interface 2 moves when the haptic signal is produced, without at the same time entirely preventing movements of the interface 2 relative to the base plate 4.

FIG. 8 shows a fourth exemplary embodiment of the apparatus.

The apparatus according to the fourth exemplary embodiment differs from the apparatus according to the third exemplary embodiment in the configuration of the flexible connection 5 between the interface 2 and the base plate 4. According to the fourth exemplary embodiment, the flexible connection 5 has springs 27. The springs 27 connect the interface 2 to the base plate 4 in a perpendicular direction. The springs 27 permit a lateral movement of the interface 2 relative to the base plate 4. The springs 27 bring about a preload of the interface 2 relative to the base plate 4, which preload must be overcome in order that the interface 2 can be moved relative to the base plate 4. Aside from the use of the springs 27 instead of the rubber buffers 28, the fourth exemplary embodiment does not differ from the third exemplary embodiment.

FIG. 9 shows a fifth exemplary embodiment of the apparatus.

The apparatus according to the fifth exemplary embodiment differs from the apparatus according to the third exemplary embodiment in the configuration of the flexible connection 5 between the interface 2 and the base plate 4. According to the fifth exemplary embodiment, the flexible connection 5 has an areal foam element 29 which is fastened to the underside of the interface 2 and to the base plate 4. The foam element 29 allows a lateral movement of the interface 2 relative to the base plate 4. The foam element 29 brings about a preload of the interface 2 relative to the base plate 4, which preload must be overcome in order that the interface 2 can be moved relative to the base plate 4. As an alternative to the foam element 29, an areal rubber element may be used.

FIG. 10 shows a sixth exemplary embodiment of the apparatus. FIG. 10 shows a lateral cross section.

The apparatus according to the sixth exemplary embodiment has a flexible connection 5 between the side surface 2*b* of the interface and the base plate 4. The flexible connection has a foam element 29. The flexible connection is formed in a lateral direction RL. A flexible connection in a perpendicular direction between the interface 2 and the base plate 4 is not provided. As is also the case in the second exemplary embodiment, the flexible connection 5 in the lateral direction RL allows a movement of the interface 2 relative to the base plate 4 in the lateral direction RL, wherein a preload produced by the flexible connection 5 must be overcome.

FIG. 11 shows a seventh exemplary embodiment of the apparatus. According to the seventh exemplary embodiment, the interface 2 is arranged in free-floating fashion over the base plate 4. The interface 2 is, at the side surface 2*a*, fastened to the base plate via the piezoelectric actuator 11 and the reinforcing elements 13*a*, 13*b*. An additional flexible connection of the interface 2 to the base plate 4 is not provided. The seventh exemplary embodiment is suitable in particular for lightweight interfaces 2, for example small displays. The first reinforcing element 13*a* may be screwed to the interface. The second reinforcing element 13*b* may be screwed to the base plate 4.

FIG. 12 shows an eighth exemplary embodiment of the apparatus.

In the case of the apparatus according to the eighth exemplary embodiment, the piezoelectric actuator 11 is arranged not to the side of the interface 2 but under the interface 2. In particular, the piezoelectric actuator 11 is arranged between the underside of the interface 2 and the base plate. Here, the piezoelectric actuator 11 is arranged such that it can stimulate the interface 2 to perform movements in the lateral direction RL.

The second reinforcing element 13*b* is fastened directly to the base plate 4. The first reinforcing element 13*a* is fastened to a first connecting element 30. The first reinforcing element 13*a* is screwed to the first connecting element 30. The first connecting element 30 is fastened to the underside of the interface 2. If the first connecting element 30 is moved in the lateral direction RL by the piezoelectric actuator 11, the interface 2 follows this movement owing to the connection of the first connecting element 30 to the interface 2.

According to the eighth exemplary embodiment, the interface 2 is arranged in free-floating fashion over the base plate 4. The interface 2 is connected to the base plate 4 only via the connection formed from the first connecting element 30, the piezoelectric actuator 11 and the two reinforcing elements 13*a*, 13*b*. An additional flexible connection is not provided.

A haptic signal is produced if an alternating voltage is applied to the piezoelectric actuator 11. A deformation of the actuator 11 is converted by the reinforcing elements 13*a*, 13*b* into a movement in the lateral direction RL with an increased movement amplitude. Since the first reinforcing element 13*a* is fastened to the first connecting element 30, and the first connecting element 30 is fastened to the interface 2, the interface 2 is moved in a lateral direction relative to the base plate 4. The haptic signal is produced in this way.

Figure 13:
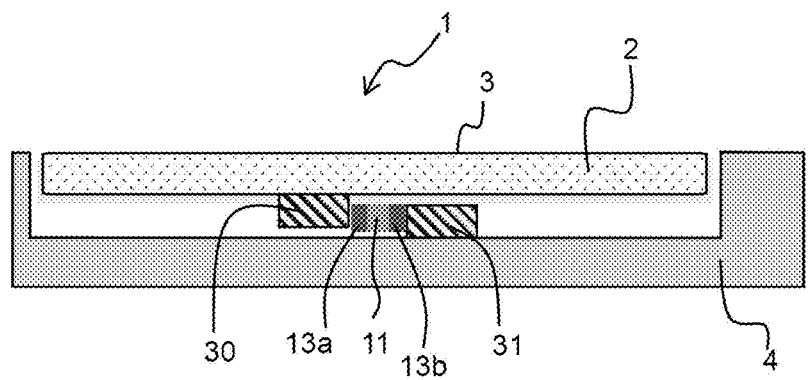

FIG. 13 shows a ninth exemplary embodiment of the apparatus.

In the case of the apparatus according to the ninth exemplary embodiment, in relation to the eighth exemplary embodiment, a second connecting element 31 is provided. The second reinforcing element 13*b* is fastened not directly to the base plate 4 but to the second connecting element 31, which in turn is fastened to the base plate 4.

Figure 14:
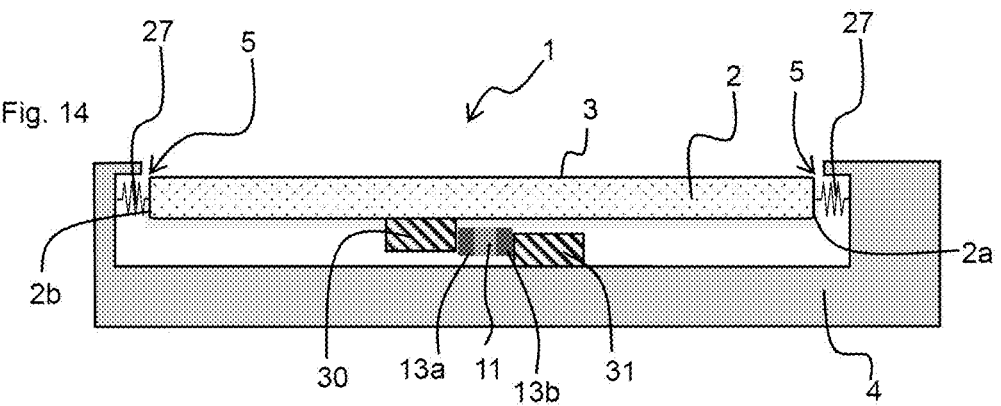

FIG. 14 shows a tenth exemplary embodiment of the apparatus.

The tenth exemplary embodiment is based on the ninth exemplary embodiment, wherein two flexible connections 5 of the interface 2 to the base plate 4 are additionally provided. The side surfaces 2*a* and 2*b* of the interface 2 are each connected to the base plate 4 in a lateral direction RL via a flexible connection 5. The flexible connections 5 have in each case one spring 27. The flexible connections 5 bring about a preload between the interface 2 and the base plate 4, which preload must be overcome in order that the interface 2 can be moved relative to the base plate 4 in a lateral direction RL to produce a haptic signal.

Figure 15A:
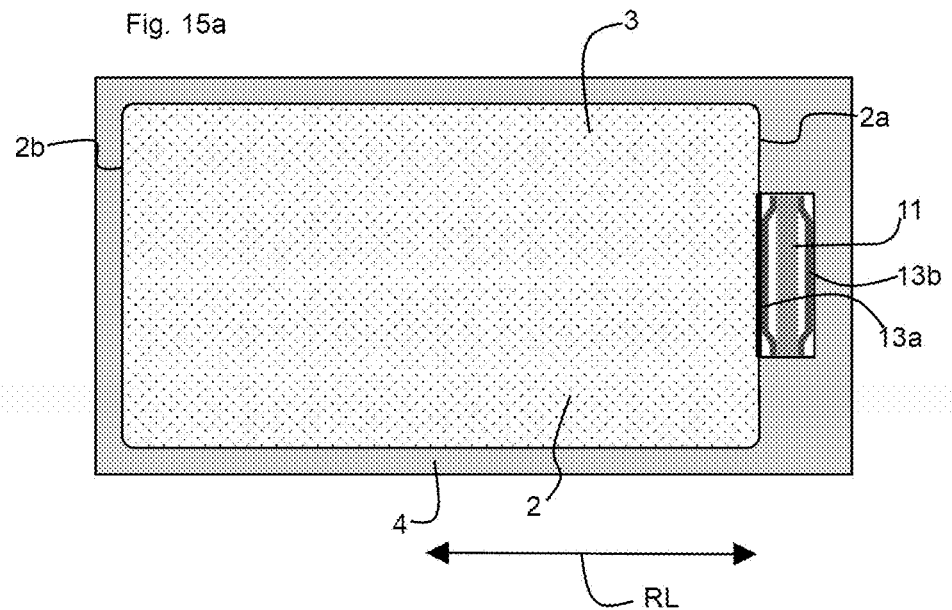
FIGS. 15a and 15b show an eleventh exemplary embodiment of an apparatus for producing a haptic feedback.
Figure 15B:
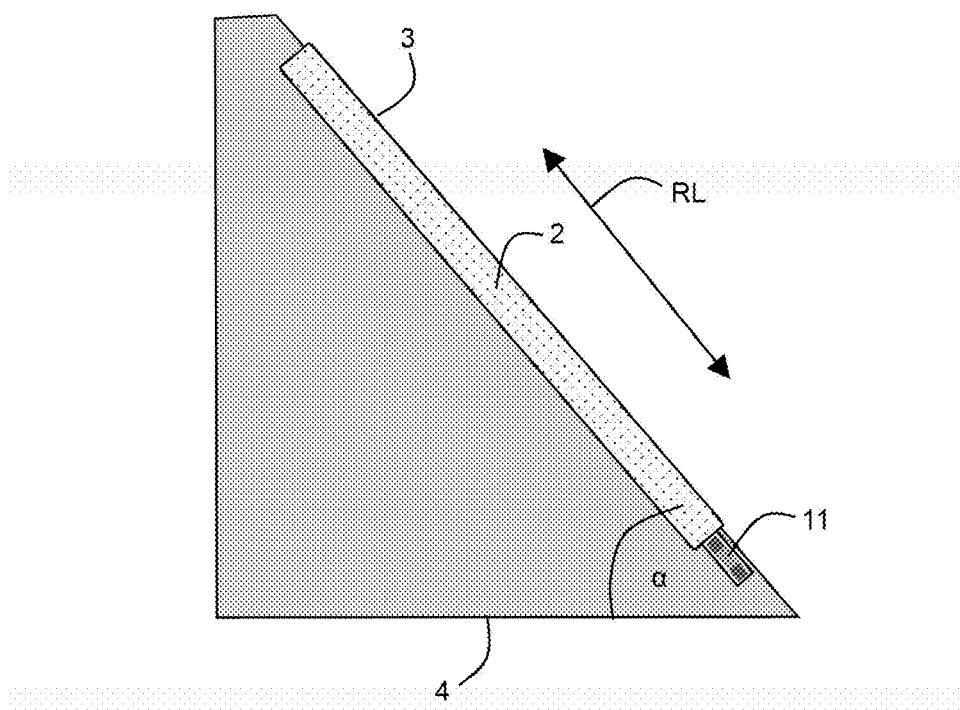

FIGS. 15*a* and 15*b* show an eleventh exemplary embodiment of the apparatus. According to the eleventh exemplary embodiment, the interface 2 is not arranged parallel to the base plate 4. Rather, the interface 2 and the base plate 4 enclose an angle $\alpha$. The piezoelectric actuator 11 is arranged on the first side surface 2*a* of the interface. The piezoelectric actuator 11 is configured to move the interface 2 in the lateral direction RL parallel to the touch-sensitive surface. This direction encloses the angle $\alpha$ with the base plate. In the exemplary embodiment shown in FIGS. 15*a* and 15*b*, the angle $\alpha$ is greater than 0° and less than 90°. An angle $\alpha$ of 0° arises in the case of a movement of the interface 2 parallel to the base plate 4, as shown in the first to tenth exemplary embodiments.

Figure 16:
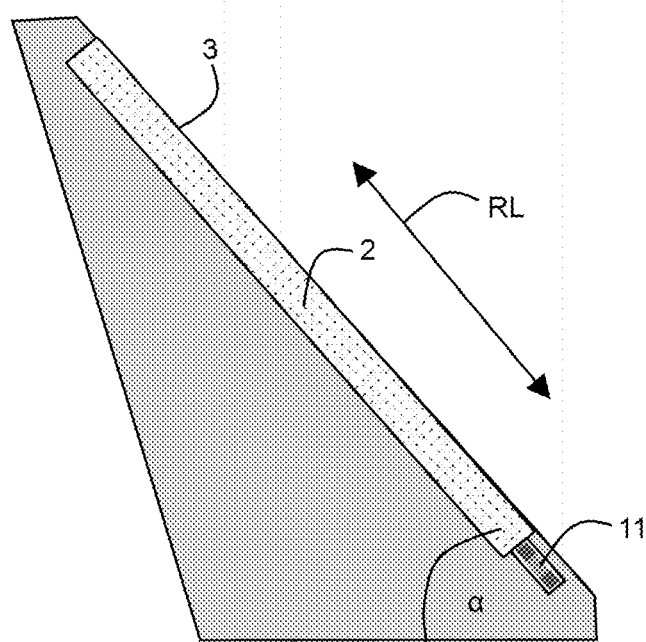
FIGS. 16 to 18 show a twelfth to fourteenth exemplary embodiment of an apparatus for producing a haptic feedback.

FIG. 16 shows a twelfth exemplary embodiment, which differs from the eleventh exemplary embodiment by a differently configured base plate 4.

Figure 17:
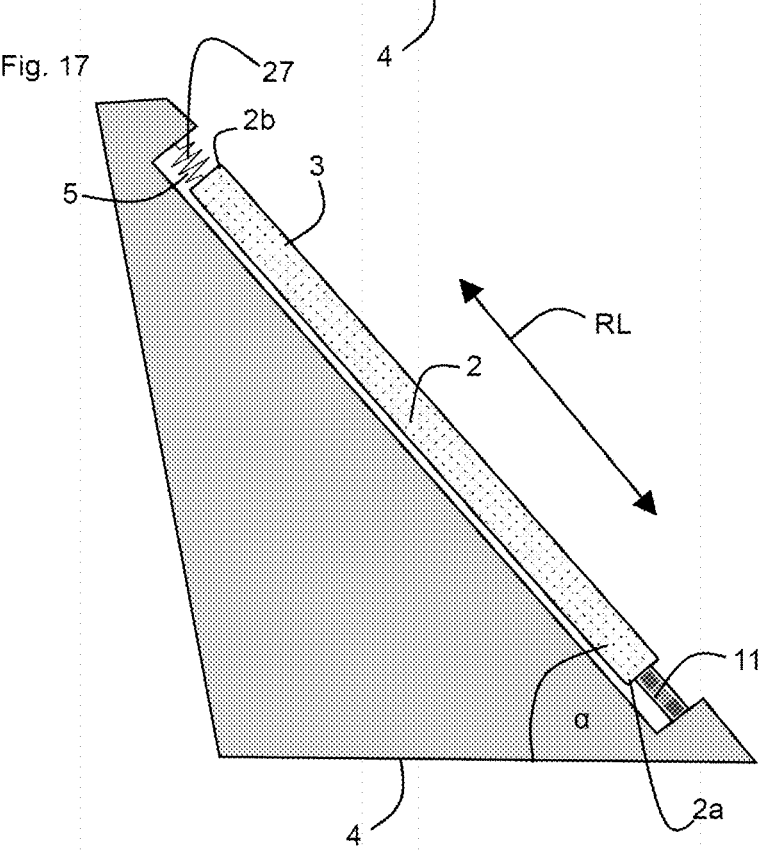

FIG. 17 shows a thirteenth exemplary embodiment. In the thirteenth exemplary embodiment, the interface 2 is likewise moved at an angle $0°<\alpha<90°$ relative to the base plate 4. The piezoelectric actuator 11 and the reinforcing elements 13a, 13b are arranged on the first side surface 2a of the interface 2. On the second side surface 2b of the interface 2, there is arranged a flexible connection 5 which has a spring 27. The spring 27 connects the second side wall 2b to the base plate 4.

Figure 18:
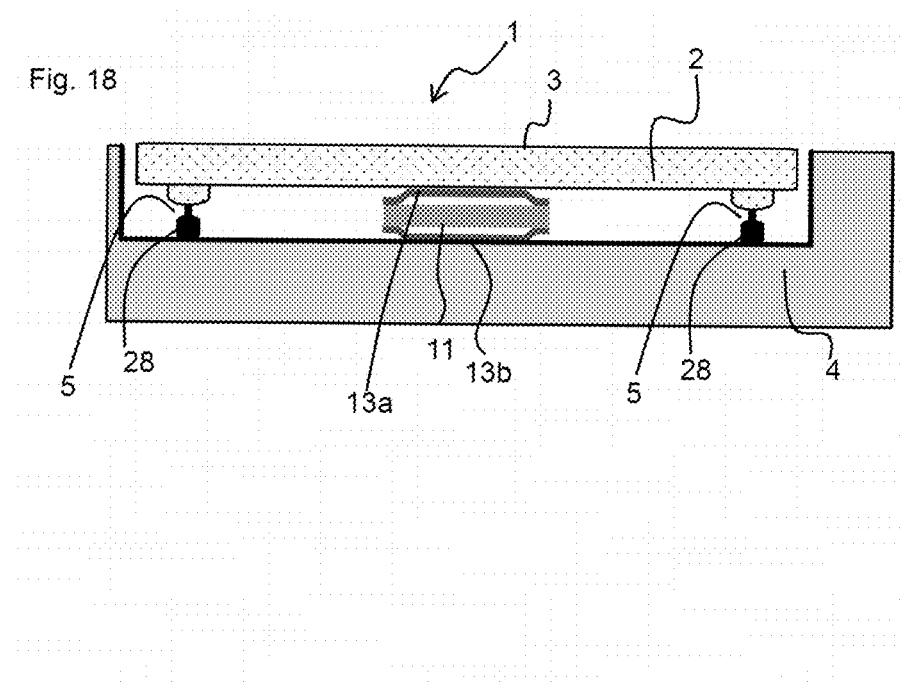

FIG. 18 shows a fourteenth exemplary embodiment of the apparatus. The piezoelectric actuator 11 and the reinforcing elements 13a, 13b are arranged between an underside, which points away from the touch-sensitive surface 3, of the interface 2 and the base plate 4. The actuator 11 is configured to move the interface 2 in a direction perpendicular to the touch-sensitive surface 3. Here, the movement direction encloses an angle α of 90° with the base plate 4. Additionally, a flexible connection 5 comprising rubber buffers 18 is formed between the underside of the interface 2 and the base plate. The flexible connection 5 serves to realize a preload between the interface 2 and the base plate 4, which preload must be overcome for a movement of the interface 2. The flexible connection 5 is configured to allow movements of the interface 2 relative to the base plate 4.

Figure 19:
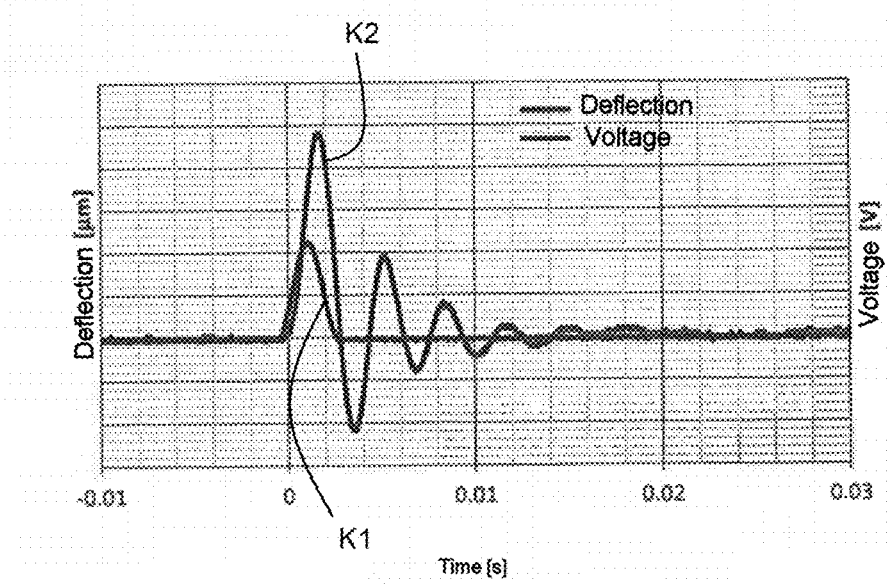
FIG. 19 shows a voltage pulse which can be applied by a control unit to the piezoelectric actuator to produce a haptic feedback and the resulting deflection of the actuator over time.

FIG. 19 shows a voltage pulse which can be applied by a control unit to the piezoelectric actuator 11 to produce a haptic feedback.

Curve K1 shows the behavior over time of the applied voltage. A single semi sinusoidal pulse having a pulse width of 3.3 ms is applied here, which corresponds to a frequency of 300 Hz.

Curve K2 shows the behavior over time of the deflection of the piezoelectric actuator 11 in the first direction as a result of the applied pulse. A maximum deflection is already achieved after about 5 ms. Accordingly the response time is very small. As a comparison, reference is made to linear resonators which usually only have a maximum deflection approximately 100 ms after applying a voltage.

Following the maximum deflection, the piezoelectric actuator 11 shows a brief decay behavior in which the amplitude of the deflections decreases rapidly.

A pulse can be applied to the actuator 11 by the control unit in such a manner that the impression of a force jump is formed for the user. This force jump can simulate the behavior of a mechanical button and thus impart to the user a click feeling.

The invention claimed is:

1. An apparatus comprising:
a base plate;
an interface with a touch-sensitive surface;
a piezoelectric actuator;
a mechanical reinforcing element,
wherein the mechanical reinforcing element is fastened to the piezoelectric actuator,
wherein the mechanical reinforcing element is fastened to the interface,
wherein the mechanical reinforcing element is configured to deform, as a result of a change of an extension of the piezoelectric actuator, in a first direction such that a partial region of the mechanical reinforcing element is moved relative to the piezoelectric actuator in a second direction perpendicular to the first direction and a force is applied to the interface,
wherein the interface is moved, by the force applied, in a direction lateral to the touch-sensitive surface, or
wherein the interface is moved, by the force applied, in a direction perpendicular to the touch-sensitive surface, and
wherein the piezoelectric actuator is configured to:
move the interface relative to the base plate to produce a haptic feedback, and
move the interface at an angle α relative to the base plate to produce the haptic feedback, wherein 0°≤α≤180; and
a control unit configured to apply a voltage pulse to the piezoelectric actuator when an actuation of the touch-sensitive surface is detected such that the mechanical reinforcing element is deformed thereby producing the haptic feedback with respect to an object pressing on the touch-sensitive surface, the haptic feedback simulating a force jump, which provides a haptic impression to a user that, after exceeding a switching point, a mechanical resistance of the touch-sensitive surface abruptly decreases.

2. The apparatus according to claim 1, wherein the interface is a screen with the touch-sensitive surface.

3. The apparatus according to claim 1, wherein the partial region of the mechanical reinforcing element is fastened to a side surface of the interface perpendicular to the touch-sensitive surface.

4. The apparatus according to claim 3, wherein the piezoelectric actuator is configured to move the interface at the angle a relative to the base plate to produce the haptic feedback, and wherein 0°≤α<90°.

5. The apparatus according to claim 1, wherein the interface is connected to the base plate via a flexible connection.

6. The apparatus according to claim 5,
wherein the flexible connection fastens the interface to the base plate in a lateral direction, and/or wherein the flexible connection fastens the interface to the base plate in the direction perpendicular to the touch-sensitive surface.

7. The apparatus according to claim 5, wherein the flexible connection has a spring, a damper, a foam element or a rubber buffer.

8. The apparatus according to claim 5, wherein the flexible connection is configured to:
allow a movement of the interface relative to the base plate, and
produce a preload to be overcome for the movement of the interface relative to the base plate.

9. The apparatus according to claim 1, wherein the piezoelectric actuator is connected to the base plate by an adhesive bonding, a screw connection, a weld or a clamping, and via at least one further element.

10. The apparatus according to claim 1, wherein the mechanical reinforcing element is connected to the interface by an adhesive bonding, a screw connection, a weld, a clamping, a bracing or a soldering, and via at least one further element.

11. The apparatus according to claim 1, wherein the mechanical reinforcing element is configured so that a movement of the partial region in the second direction has a larger amplitude than a variation of the extension of the piezoelectric actuator in the first direction.

12. The apparatus according to claim 1,
wherein the partial region is arranged at a distance from a surface of the piezoelectric actuator,
wherein the mechanical reinforcing element has two end regions fastened to the surface of the piezoelectric actuator,
wherein the two end regions of the mechanical reinforcing element directly adjoin the partial region of the mechanical reinforcing element, and wherein the two end regions are arranged on opposite sides of the partial region of the mechanical reinforcing element.

13. The apparatus according to claim 1, wherein the mechanical reinforcing element is bow-shaped.

14. The apparatus according to claim 1, further comprising a second mechanical reinforcing element fastened to the piezoelectric actuator, wherein the piezoelectric actuator is arranged between the two mechanical reinforcing elements, and wherein the second mechanical reinforcing element is configured to deform, as a result of a variation of the extension of the piezoelectric actuator, in the first direction such that a partial region of the second mechanical reinforcing element is moved relative to the piezoelectric actuator in a second direction perpendicular to the first direction.

15. The apparatus according to claim 1, wherein the interface is connected to the base plate only via two reinforcing elements and the piezoelectric actuator and wherein the apparatus has no further mechanical connection between the interface and the base plate.

16. An apparatus comprising:
a base plate;
an interface with a touch-sensitive surface;
a piezoelectric actuator; and
a mechanical reinforcing element,
wherein the mechanical reinforcing element is fastened to the piezoelectric actuator,
wherein the mechanical reinforcing element is fastened to the interface,
wherein the mechanical reinforcing element is configured to deform, as a result of a change of an extension of the piezoelectric actuator, in a first direction such that a partial region of the mechanical reinforcing element is moved relative to the piezoelectric actuator in a second direction perpendicular to the first direction and a force is applied to the interface,
wherein the interface is moved, by the force applied, in a direction lateral to the touch-sensitive surface, or
wherein the interface is moved, by the force applied, in a direction perpendicular to the touch-sensitive surface,
wherein the piezoelectric actuator is configured to:
move the interface relative to the base plate to produce a haptic feedback, and
move the interface at an angle $\alpha$ relative to the base plate to produce the haptic feedback, wherein $0° \leq \alpha \leq 180°$,
wherein the interface is connected to the base plate only via two reinforcing elements and the piezoelectric actuator, and
wherein the apparatus has no further mechanical connection between the interface and the base plate.

17. The apparatus according to claim 16, wherein the interface is a screen with the touch-sensitive surface.

18. The apparatus according to claim 16, wherein the partial region of the mechanical reinforcing element is fastened to a side surface of the interface perpendicular to the touch-sensitive surface.

19. The apparatus according to claim 16, wherein the piezoelectric actuator is configured to move the interface at the angle $\alpha$ relative to the base plate to produce the haptic feedback, and wherein $0° \leq \alpha < 90°$.

20. The apparatus according to claim 16, wherein the interface is connected to the base plate via a flexible connection.

* * * * *